United States Patent
Lv (10) Patent No.: US 9,894,349 B2
(45) Date of Patent: Feb. 13, 2018

(54) 3D DISPLAY METHOD FOR DISPLAYING 3D IMAGES AND DISPLAY DEVICE

(71) Applicant: BOE TECHNOLOGY GROUP CO., LTD., Beijing (CN)

(72) Inventor: Jing Lv, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 378 days.

(21) Appl. No.: 14/126,976

(22) PCT Filed: Dec. 23, 2012

(86) PCT No.: PCT/CN2012/087231
§ 371 (c)(1),
(2) Date: Dec. 17, 2013

(87) PCT Pub. No.: WO2014/008748
PCT Pub. Date: Jan. 16, 2014

(65) Prior Publication Data
US 2014/0347409 A1  Nov. 27, 2014

(30) Foreign Application Priority Data
Jul. 9, 2012 (CN) .......................... 2012 1 0237877

(51) Int. Cl.
*H04N 13/04* (2006.01)

(52) U.S. Cl.
CPC ..... *H04N 13/0486* (2013.01); *H04N 13/0409* (2013.01); *H04N 13/0497* (2013.01)

(58) Field of Classification Search
CPC ........... H04N 13/0486; H04N 13/0497; H04N 13/0409
See application file for complete search history.

(56) References Cited

U.S. PATENT DOCUMENTS 8,982,196 B2 * 3/2015 Jung ...................... G02B 27/26
345/419
2001/0009411 A1 * 7/2001 Kusanagi ............. G09G 3/3648
345/93

(Continued)

FOREIGN PATENT DOCUMENTS

CN  101825773 A  9/2010
CN  102207645 A  10/2011

(Continued)

OTHER PUBLICATIONS

International Search Report dated Apr. 1, 2013 Appln. No. PCT/CN2012/087231.

(Continued)

*Primary Examiner* — Sejoon Ahn
(74) *Attorney, Agent, or Firm* — Ladas & Parry LLP; Loren K. Thompson (57) ABSTRACT

A 3D display method and a display device. The method includes: step a: driving first sub-pixels of odd numbered rows of pixels to display a first left eye image, driving first sub-pixels of even numbered rows of pixels to display a first right eye image, driving second sub-pixels of the odd numbered rows of pixels to display a black image, and driving second sub-pixels of the even numbered rows to display a black image; and step b: driving second sub-pixels of the odd numbered rows of pixels to display a second left eye image, driving second sub-pixels of even numbered rows of pixels to display a second right eye image, driving first sub-pixels of the odd numbered rows of pixels to display a black image, and driving first sub-pixels of the even numbered rows to display a black image.

13 Claims, 4 Drawing Sheets

(56) References Cited

U.S. PATENT DOCUMENTS

| | | | | |
|---|---|---|---|---|
| 2002/0145682 A1* | 10/2002 | Kwon | ............... | G02F 1/133528 349/15 |
| 2008/0191966 A1* | 8/2008 | Van Berkel | ...................... | 345/32 |
| 2008/0291152 A1* | 11/2008 | Nakao et al. | ................. | 345/102 |
| 2009/0096726 A1* | 4/2009 | Uehara | .............. | G02B 27/2214 345/84 |
| 2009/0096943 A1* | 4/2009 | Uehara et al. | .................. | 349/37 |
| 2009/0140950 A1* | 6/2009 | Woo | ................... | G02B 27/2214 345/4 |
| 2010/0110317 A1* | 5/2010 | Chen | .............................. | 349/15 |
| 2011/0221655 A1* | 9/2011 | Fukui | ................................ | 345/4 |
| 2011/0254929 A1 | 10/2011 | Yang et al. | | |
| 2012/0062561 A1* | 3/2012 | Koyama | ....................... | 345/419 |
| 2012/0105496 A1* | 5/2012 | Komiya | ........................ | 345/690 |
| 2012/0146994 A1* | 6/2012 | Jeong | ................ | H04N 13/0497 345/419 |
| 2012/0274678 A1* | 11/2012 | Oda | ................... | H04N 13/0422 345/691 |
| 2013/0021334 A1* | 1/2013 | Lee | ........................ | G09G 3/003 345/419 |
| 2013/0088418 A1* | 4/2013 | Kim | ................... | H04N 13/0434 345/92 |
| 2013/0088526 A1* | 4/2013 | Koito | ..................... | G09G 3/003 345/690 |
| 2013/0100175 A1* | 4/2013 | Koito | ................. | H04N 13/0409 345/690 |
| 2013/0229326 A1* | 9/2013 | Kamada | ......................... | 345/32 |
| 2013/0249976 A1* | 9/2013 | Kunieda | ................ | G09G 3/003 345/698 |
| 2014/0071066 A1* | 3/2014 | Lee, II | ................. | G06F 3/0416 345/173 |
| 2014/0146149 A1* | 5/2014 | Wu | .................... | H04N 13/0404 348/59 |

FOREIGN PATENT DOCUMENTS

| | | |
|---|---|---|
| CN | 102376242 A | 3/2012 |
| CN | 102724539 A | 10/2012 |
| CN | 102752617 A | 10/2012 |

OTHER PUBLICATIONS

First Chinese Office Action dated Feb. 24, 2014 Appln. No. 201210237877.3.

Second Chinese Office Action Appln. No. 201210237877.3; dated Sep. 1, 2014.

International Preliminary Report on Patentability Appln. No. PCT/CN2012/087231; dated Jan. 13, 2015.

* cited by examiner

3D DISPLAY METHOD FOR DISPLAYING 3D IMAGES AND DISPLAY DEVICE

TECHNICAL FIELD

The present invention relates to a three dimension (3D) display method and a display device.

BACKGROUND

In recent years, entertainment programs such as TV programs and movies currently still most adopt 2D (Two-Dimension) images, however people are becoming more and more unsatisfied with 2D images, 3D (Three-Dimension) stereoscopic images are inexorable trend of future image display. The display principle of 3D images is to let left eye of a human see a left eye image and right eye see a corresponding right eye image, and the left and right images are a pair of images with displacement difference, making the viewer see a 3D stereoscopic image similar to the image of an actual object.

The polaroid glasses type stereo display is a mainstream technology in current stereo display field, which is accepted by viewers due to its characteristics such as non-scintillation, light weight and small crosstalk. However, in prior art, when displaying a 3D picture on a panel in a polaroid glasses approach, the view angle is small in the vertical direction of the 3D panel of polaroid glasses type, which influences the experience of viewing 3D picture, and the power consumption of a 3D panel is large.

SUMMARY

The embodiments of the present invention provide a 3D display method and a display device for addressing problems in the traditional technology that the view angle in the vertical direction of a 3D panel is small, and power consumption is large and/or other problems.

One aspect of the present invention provides a 3D display method for displaying 3D images on a display panel wherein each pixel in the display panel includes a first sub-pixel and a second sub-pixel, the method including:

step a: driving first sub-pixels of odd numbered rows of pixels to display a first left eye image, driving first sub-pixels of even numbered rows of pixels to display a first right eye image, wherein the first left eye image is an odd numbered row image of a left eye image and the first right eye image is an odd numbered row image of a right eye image, and driving second sub-pixels of the odd numbered rows of pixels to display a black image, and driving second sub-pixels of the even numbered rows to display a black image;

step b: driving second sub-pixels of the odd numbered rows of pixels to display a second left eye image, driving second sub-pixels of even numbered rows of pixels to display a second right eye image, wherein the second left eye image is an even numbered row image of the left eye image and the second right eye image is an even numbered row image of the right eye image, and driving first sub-pixels of the odd numbered rows of pixels to display a black image, and driving first sub-pixels of the even numbered rows to display a black image;

performing steps a and b in a loop until the images are displayed completely.

For example, each pixel in the display panel further includes a first switch and a second switch.

For example, the display panel further includes:

first gate lines connected with gates of first switches of the first sub-pixels of the odd numbered rows of pixels;

second gate lines connected with gates of first switches of the second sub-pixels of the odd numbered rows of pixels;

third gate lines connected with gates of first switches of the first sub-pixels of the even numbered rows of pixels;

fourth gate lines connected with gates of first switches of the second sub-pixels of the even numbered rows of pixels;

first common electrode lines connected with gates of second switches of first sub-pixels of the odd numbered rows of pixels and connected with sources of second switches of second sub-pixels of the odd numbered rows of pixels;

second common electrode lines connected with gates of second switches of second sub-pixels of the odd numbered rows of pixels and connected with sources of second switches of first sub-pixels of the odd numbered rows of pixels;

third common electrode lines connected with gates of second switches of first sub-pixels of the even numbered rows of pixels and connected with sources of second switches of second sub-pixels of the even numbered rows of pixels;

fourth common electrode lines connected with sources of second switches of first sub-pixels of the even numbered rows of pixels and connected with gates of second switches of second sub-pixels of the even numbered rows of pixels;

data lines connected with sources of the first switches of all the sub-pixels.

For example, the step a of driving first sub-pixels of the odd numbered rows of pixels to display a first left eye image, driving first sub-pixels of the even numbered rows of pixels to display a first right eye image, driving second sub-pixels of the odd numbered rows of pixels to display a black image and driving the second sub-pixels of the even numbered rows to display a black image comprises:

inputting an ON signal to the first gate lines to turn on the first switches of the first sub-pixels of the odd numbered rows of pixels, transmitting the first left eye image to the first sub-pixels of the odd numbered rows of pixels through the sources of the first switches of the first sub-pixels of the odd numbered rows of pixels connected by the data lines, to drive the first sub-pixels of the odd numbered rows of pixels to display the first left eye image;

inputting an ON signal to the third gate lines to turn on the first switches of the first sub-pixels of the even numbered rows of pixels, to transmits the first right eye image to the first sub-pixels of the even numbered rows of pixels through the sources of the first switches of the first sub-pixels of the even numbered rows of pixels connected by the data line, to drive the first sub-pixels of the even numbered rows of pixels to display the first right eye image;

inputting an ON signal to the second common electrode lines to turn on the second switches of the second sub-pixels of the odd numbered rows of pixels, to transmit the black image to the second sub-pixels of the odd numbered rows of pixels through the sources of the second switches of the second sub-pixels of the odd numbered rows of pixels connected with the first common electrode lines, to drive the second sub-pixels of the odd numbered rows of pixels to display the black image;

inputting an ON signal to the fourth common electrode lines to turn on the second switches of the second sub-pixels of the even numbered rows of pixels, to transmit the black image to the second sub-pixels of the even numbered rows of pixels through the sources of the second switches of the second sub-pixels of the even numbered rows of pixels connected with the third common electrode lines, to drive the second sub-pixels of the even numbered rows of pixels to display the black image.

For example, the step b of driving second sub-pixels of the odd numbered rows of pixels to display a second left eye image, driving second sub-pixels of the even numbered rows of pixels to display a second right eye image, driving first sub-pixels of the odd numbered rows of pixels to display a black image and driving the first sub-pixels of the even numbered rows to display a black image comprises:

inputting an ON signal to the second gate lines to turn on the first switches of the second sub-pixels of the odd numbered rows of pixels, to transmit the second left eye image to the second sub-pixels of the odd numbered rows of pixels through the sources of the first switches of the second sub-pixels of the odd numbered row of pixels connected by the data line, to drive the second sub-pixels of the odd numbered rows of pixels to display the second left eye image;

inputting an ON signal to the fourth gate lines to turn on the first switches of the second sub-pixels of the even numbered rows of pixels, to transmit the second right eye image to the second sub-pixels of the even numbered rows of pixels through the sources of the first switches of the second sub-pixels of the even numbered rows of pixels connected by the data lines, to drive the second sub-pixels of the even numbered rows of pixels to display the second right eye image;

inputting an ON signal to the first common electrode lines to turn on the second switches of the first sub-pixels of the odd numbered rows of pixels, to transmit the black image to the first sub-pixels of the odd numbered rows of pixels through the sources of the second switches of the first sub-pixels of the odd numbered rows of pixels connected with the second common electrode lines, to drive the first sub-pixels of the odd numbered rows of pixels to display the black image;

inputting an ON signal to the third common electrode lines to turn on the second switches of the first sub-pixels of the even numbered rows of pixels, to transmit the black image to the first sub-pixels of the even numbered rows of pixels through the sources of the second switches of the first sub-pixels of the even numbered rows of pixels connected with the fourth common electrode lines, to drive the first sub-pixels of the even numbered rows of pixels to display the black image.

For example, each pixel in the display panel includes a first sub-pixel and a second sub-pixel, each row of the first sub-pixel and each row of the second sub-pixels are arranged alternately.

For example, the first sub-pixels and the second sub-pixels are arranged alternately in a column direction.

For example, the method further comprises prior to the step a:

converting a 2D image into a left eye image and a right eye image for 3D display.

Another aspect of the present invention provides a 3D display device including:

a display panel including a plurality rows and columns of pixels arranged in an array, the plurality rows of pixels including odd numbered rows of pixels and even numbered rows of pixels, and each pixel including a first sub-pixel and a second sub-pixel;

each pixel in the display panel further including a first switch and a second switch;

the display panel further includes:

first gate lines connected with gates of first switches of the first sub-pixels of the odd numbered rows of pixels;

second gate lines connected with gates of first switches of the second sub-pixels of the odd numbered rows of pixels;

third gate lines connected with gates of first switches of the first sub-pixels of the even numbered rows of pixels;

fourth gate lines connected with gates of first switches of the second sub-pixels of the even numbered rows of pixels;

first common electrode lines connected with gates of second switches of first sub-pixels of the odd numbered rows of pixels and connected with sources of second switches of second sub-pixels of the odd numbered rows of pixels;

second common electrode lines connected with gates of second switches of second sub-pixels of the odd numbered rows of pixels and connected with sources of second switches of first sub-pixels of the odd numbered rows of pixels;

third common electrode lines connected with gates of second switches of first sub-pixels of the even numbered rows of pixels and connected with sources of second switches of second sub-pixels of the even numbered rows of pixels;

fourth common electrode lines connected with sources of second switches of first sub-pixels of the even numbered rows of pixels and connected with gates of second switches of second sub-pixels of the even numbered rows of pixels;

data lines connected with sources of the first switches of all the sub-pixels.

For example, the 3D display device further includes:

a first input unit for inputting an ON signal to the first gate lines to turn on the first switches of the first sub-pixels of the odd numbered rows of pixels, inputting an ON signal to the third gate lines to turn on the first switches of the first sub-pixels of the even numbered rows of pixels, inputting an ON signal to the second common electrode lines to turn on the second switches of the second sub-pixel of the odd numbered rows of pixels, and inputting an ON signal to the fourth common electrode lines to turn on the second switches of the second sub-pixels of the even numbered rows of pixels;

a first driving unit for transmitting the first left eye image to the first sub-pixels of the odd numbered rows of pixels through the sources of the first switches of the first sub-pixels of the odd numbered rows of pixels connected by the data lines, to drive the first sub-pixels of the odd numbered rows of pixels to display the first left eye image, transmitting the first right eye image to the first sub-pixels of the even numbered rows of pixels through the sources of the first switches of the first sub-pixels of the even numbered rows of pixels connected by the data lines, to drive the first sub-pixels of the even numbered rows of pixels to display the first right eye image, transmitting the black image to the second sub-pixels of the odd numbered rows of pixels through the sources of the second switches of the second sub-pixels of the odd numbered rows of pixels connected with the first common electrode lines, to drive the second sub-pixels of the odd numbered rows of pixels to display the black image, and transmitting the black image to the second sub-pixels of the even numbered rows of pixels through the sources of the second switches of the second sub-pixels of the even numbered rows of pixels connected with the third common electrode lines, to drive the second sub-pixels of the even numbered rows of pixels to display the black image, wherein the first left eye image is an odd numbered row image of the left eye image and the first right eye image is an odd numbered row image of the right eye image.

For example, the 3D display device further includes:

a second input unit for inputting an ON signal to the second gate lines to turn on the first switches of the second sub-pixels of the odd numbered rows of pixels, inputting an ON signal to the fourth gate lines to turn on the first switches of the second sub-pixels of the even numbered rows of pixels, inputting an ON signal to the first common electrode lines to turn on the second switches of the first sub-pixels of the odd numbered rows of pixels, and inputting an ON signal to the third common electrode lines to turn on the second switches of the first sub-pixels of the even numbered rows of pixels;

a second driving unit for transmitting the second left eye image to the second sub-pixels of the odd numbered rows of pixels through the sources of the first switches of the second sub-pixels of the odd numbered rows of pixels connected by the data lines, to drive the second sub-pixels of the odd numbered rows of pixels to display the second left eye image, transmitting the second right eye image to the second sub-pixels of the even numbered rows of pixels through the sources of the first switches of the second sub-pixels of the even numbered rows of pixels connected by the data lines, to drive the second sub-pixels of the even numbered rows of pixels to display the second right eye image, transmitting the black image to the first sub-pixels of the odd numbered rows of pixels through the sources of the second switches of the first sub-pixels of the odd numbered rows of pixels connected with the second common electrode lines, to drive the first sub-pixels of the odd numbered rows of pixels to display the black image, and transmitting the black image to the first sub-pixels of the even numbered rows of pixels through the sources of the second switches of the first sub-pixels of the even numbered rows of pixels connected with the fourth common electrode lines, to drive the first sub-pixels of the even numbered rows of pixels to display the black image, wherein the second left eye image is an even numbered row image of the left eye image and the second right eye image is an even numbered row image of the right eye image.

For example, the first input unit is connected with the first gate lines, third gate lines, second common electrode lines and fourth common electrode lines;

the first driving unit is connected with the data lines, first common electrode lines and third common electrode lines;

the second input unit is connected with the second gate lines, fourth gate lines, first common electrode lines and third common electrode lines;

the second driving unit is connected with the data lines, second common electrode lines and fourth common electrode lines.

For example, each pixel in the display panel includes a first sub-pixel and a second sub-pixel, each row of the first sub-pixel and each row of the second sub-pixels are arranged alternately.

For example, the first sub-pixels and the second sub-pixels are arranged alternately in a column direction.

For example, in the display panel, the first common electrode lines and the second common electrode lines divide each pixel of the odd numbered rows of pixels into a first sub-pixel and a second sub-pixel;

the third common electrode lines and the fourth common electrode lines divide each pixel of the even numbered rows of pixels into a first sub-pixel and a second sub-pixel.

For example, the 3D display device further includes:

an image conversion unit for converting a 2D image into a left eye image and a right eye image for 3D display.

Yet another aspect of the present invention provides a 3D display device including:

a display panel, each pixel in the display panel including a first sub-pixel and a second sub-pixel;

a first driving unit for driving first sub-pixels of odd numbered rows of pixels to display a first left eye image, driving first sub-pixels of an even numbered rows of pixels to display a first right eye image, wherein the first left eye image is an odd numbered row image of the left eye image and the first right eye image is the odd numbered row image of the right eye image, and driving the second sub-pixels of the odd numbered rows of pixels to display a black image, and driving the second sub-pixels of the even numbered row of pixels to display a black image;

a second driving unit for driving second sub-pixels of odd numbered rows of pixels to display a second left eye image, driving second sub-pixels of an even numbered rows of pixels to display a second right eye image, wherein the second left eye image is an even numbered row image of the left eye image and the second right eye image is the even numbered row image of the right eye image, and driving the first sub-pixels of the even numbered rows of pixels to display a black image, and driving the first sub-pixels of the odd numbered rows of pixels to display a black image.

For example, the first sub-pixels and the second sub-pixels are arranged alternately in a column direction.

BRIEF DESCRIPTION OF THE DRAWINGS

For better understanding technical proposals according to an embodiment of the present invention, drawings of the embodiments will be described briefly below. Obviously, drawings in the following description only relate to some embodiments of the present invention, not to limit the present invention.

DETAILED DESCRIPTION

In order to make the purpose, technology solution and advantages of embodiments of the present invention more clear, technology solutions according to an embodiment of the present invention will be described clearly and completely below with respect to drawings of embodiments of the present invention. It is to be understood that the described embodiments are part of but not all of embodiments of the present invention. Based on the described embodiments of the present invention, all other embodiments obtained by those of ordinary skill in the art without any creative labor fall into the protecting scope of the present invention.

Embodiment I

Figure 1:
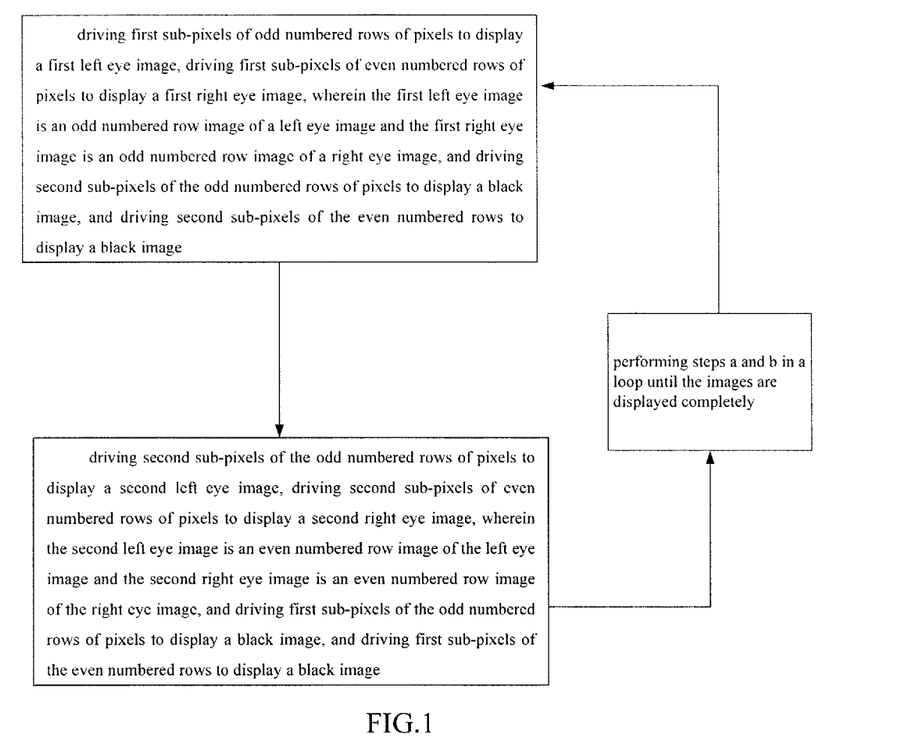
FIG. 1 is a flowchart of a 3D display method provided in embodiment I of the present invention.

An embodiment of the present invention provides a 3D display method for displaying 3D images on a display panel, and each pixel in the display panel includes a first sub-pixel and a second sub-pixel as illustrated in FIG. 1, the method including:

step a: driving first sub-pixels of odd numbered rows of pixels to display a first left eye image, driving first sub-pixels of even numbered rows of pixels to display a first right eye image, wherein the first left eye image is the odd numbered row image of the left eye image, the first right eye image is the odd numbered row image of the right eye image, driving second sub-pixels of the odd numbered rows of pixels to display a black image, and driving a second sub-pixel of the even numbered rows of pixels to display a black image;

step b: driving second sub-pixels of the odd numbered rows of pixels to display a second left eye image, driving second sub-pixels of even numbered rows of pixels to display a second right eye image, wherein the second left eye image is the even numbered row image of the left eye image, the second right eye image is the even numbered row image of the right eye image, driving first sub-pixels of the odd numbered rows of pixels to display a black image, and driving first sub-pixels of the even numbered rows of pixels to display a black image;

performing steps a and b in a loop until the images are displayed completely.

It is noted that an odd numbered row of pixels or an even numbered row of pixels in the embodiments of the present invention are only illustrative explanation of adjacent two rows of sub-pixels, one of ordinary skill in the art may modify their position relationship according to the design requirements.

As an example, a 3D display method provided in an embodiment of the present invention may include the following.

S101, a 3D display device converts a 2D image into a left eye image and a right eye image for 3D display.

The 3D display method proposed in the embodiment of the present invention will be detailed as follows with respect to the structure of the display panel in the 3D display device.

Figure 2:
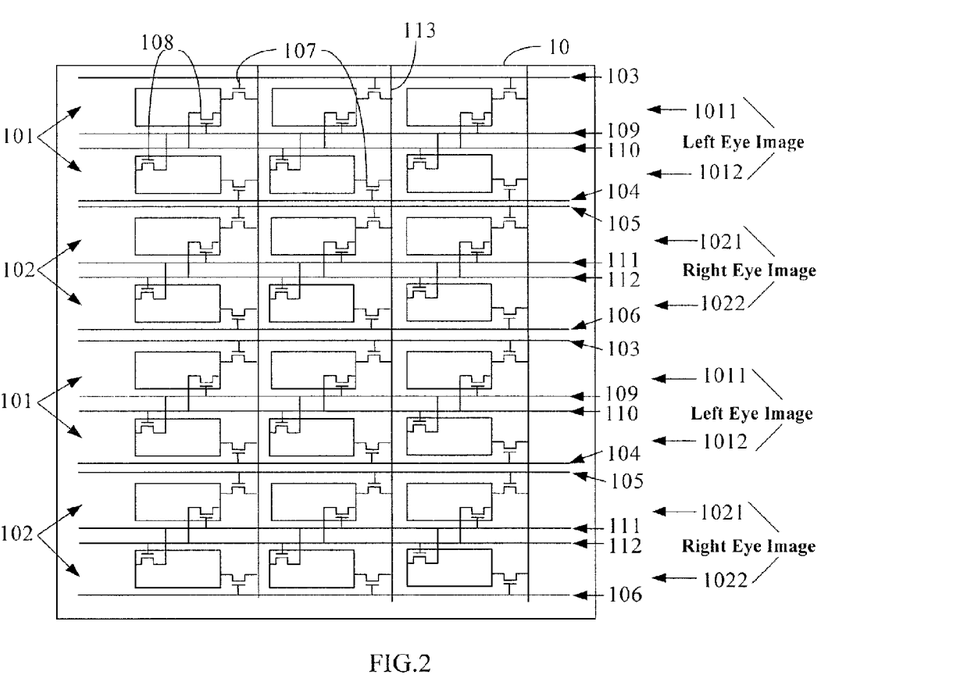
FIG. 2 is a structural representation of a display panel provided in embodiment I of the present invention.

The display panel 10 of the 3D display device includes a plurality of rows and columns of pixels arranged in array, each pixel includes a first sub-pixel and a second sub-pixel, the rows of the first sub-pixels and the rows of the second sub-pixels are disposed alternately, as illustrated in FIG. 2. Or, the first sub-pixels and the second sub-pixels are arranged alternately in the column direction. The plurality of rows of pixels include odd numbered rows of pixels 101 and even numbered rows of pixels 102; the odd numbered rows of pixels 101 include first sub-pixels 1011 and second sub-pixels 1012 of the odd numbered row pixels 101, and the even numbered pixels 102 include first sub-pixels 1021 and second sub-pixels 1022 of the even numbered row pixels 102.

Each pixel in the display panel 10 further includes a first switch 107 and a second switch 108.

The display panel 10 further includes:

a first gate line 103 connected with a gate of a first switch 107 of the first sub-pixel 1011 of an odd numbered row of pixels 101;

a second gate line 104 connected with a gate of a first switch 107 of the second sub-pixel 1012 of the odd numbered row of pixels 101;

a third gate line 105 connected with a gate of a first switch 107 of the first sub-pixel 1021 of an even numbered row of pixels 102;

a fourth gate line 106 connected with a gate of a first switch 107 of the second sub-pixel 1022 of the even numbered row of pixels 102;

a first common electrode line 109 connected with a gate of a second switch 108 of the first sub-pixel 1011 of the odd numbered row of pixels 101 and connected with a source of a second switch 108 of the second sub-pixel 1012 of the odd numbered row of pixels 101;

a second common electrode line 110 connected with a gate of the second switch 108 of the second sub-pixel 1012 of the odd numbered row of pixels 101 and connected with a source of the second switch 108 of the first sub-pixel 1011 of the odd numbered row of pixels 101;

a third common electrode line 111 connected with a gate of a second switch 108 of the first sub-pixel 1021 of the even numbered row of pixels 102 and connected with a source of a second switch 108 of the second sub-pixel 1022 of the even numbered row of pixels 102;

a fourth common electrode line 112 connected with a source of the second switch 108 of the first sub-pixel 1021 of the even numbered row of pixels 102 and connected with a gate of the second switch 108 of the second sub-pixel 1022 of the even numbered row of pixels 102;

a data line 113 connected with a source of a first switch 107 of the each sub-pixel.

When the 3D display device is in working, if it is desired to display a 2D image, the odd numbered rows of pixels 101 and the even numbered rows of pixels 102 both display the 2D image, and the first sub-pixel 1011 and the second sub-pixel 1012 of the odd numbered row pixels 101 display the same image, the first sub-pixel 1021 and the second sub-pixel 1022 of the even numbered row pixels 102 both display the same image; if it is desired to display a 3D image, it is necessary to convert the 2D image into a 3D image including a left eye image and a right eye image, wherein the left eye image and the right eye image are different in displacement, and the left eye image and the right eye image both are complete images.

It should be noted why a 2D image is converted into a left eye image and a right eye image with different displacement: In real life, people view an object with two eyes. Due to the certain distance between left and right eyes (the two eyes are spaced by about 6.35 cm), and therefore the two eyes, when viewing any object, will not be at the same angle. When viewing an object with left and right eyes separately, one feels that the object has been displaced for a small distance, and this displacement is transferred to the brain via retina to generate a depth regarding distance, thereby generating stereoscopic sensation. Here, the 3D image display utilizes the principle of generating stereoscopic sensation by parallax generated in brain by left and right eye pupil distance, projects left and right images with different displacement therebetween onto a screen and a viewer views successive left and right two images with left and right eyes respectively, which allows the viewer feels personally in the environment shown on the scene, hence forming a stereo image.

What needs to be supplemented is that, the embodiments of the present invention do not limit how the 3D display device converts a 2D image into a 3D image, that is, a plurality of algorithms can be used to convert a 2D image into a 3D image.

It is noted that, if the image to be displayed itself is a 3D image, step S101 can be omitted.

S102. The 3D display device inputs a high level signal to the first gate line to turn on first switches of first sub-pixels of the odd numbered row of pixels, inputs a high level signal to the third gate line to turn on first switches of first sub-pixels of the even numbered row of pixels, inputs a high level signal to the second common electrode line to turn on second switches of second sub-pixels of the odd numbered row of pixels, and inputs a high level signal to the fourth common electrode line to turn on second switches of second sub-pixels of the even numbered row of pixels.

After a 2D image is converted into a left eye image and a right eye image for 3D display, the 3D display device inputs a high level signal Vgh to the first gate line. A first switch is disposed between the first gate line and each first sub-pixel of the odd numbered row of pixels, which may be a TFT (Thin Film Transistor), a MOS (Metal-Oxide-Semiconductor) transistor, or the like. The first gate line transmits the high level signal Vgh to a gate of the first switch to turn on the first switch of each first sub-pixel of the odd numbered row of pixels, which in turn turns on the first sub-pixel of the odd numbered row of pixels. The 3D display device inputs a high level signal Vgh to a third gate line. A first switch is disposed between the third gate line and each first sub-pixel of the even numbered row of pixels. The third gate line transmits the high level signal Vgh to the gate of the first switch to turn on the first switch of each first sub-pixel of the even numbered row of pixels.

At the same time, the 3D display device inputs a high level signal Vch to the second common electrode line. A second switch is disposed between the second common electrode line and each second sub-pixel of the odd numbered row of pixels, which may be a TFT, a MOS transistor, or the like. The second common electrode line transmits the high level signal Vch to a gate of the second switch to turn on the second switch of each second sub-pixel of the odd numbered row of pixels, which in turn turns on the second sub-pixel of the odd numbered row of pixels. The 3D display device inputs a high level signal Vch to the fourth common electrode line. A second switch is disposed between the fourth common electrode line and each second sub-pixel of the even numbered row of pixels. The fourth common electrode line transmits the high level signal Vch to the gate of the second switch to turn on the second switch of each second sub-pixel of the even numbered row of pixels, which in turn turns on the second sub-pixel of the even numbered row pixels.

S103. The 3D display device drives the first sub-pixels of the odd numbered row of pixels to display a first left eye image, drives the first sub-pixel of the even numbered row of pixels to display a first right eye image, wherein the first left eye image is the odd numbered row image of the left eye image and the first right eye image is the odd numbered row image of the right eye image, and drives the second sub-pixels of the odd numbered row of pixels to display a black image, and drives the second sub-pixels of the even numbered row of pixels to display a black image.

After the first sub-pixels of the odd numbered row of pixels and the first sub-pixels of the even numbered row of pixels are turned on, the 3D display device drives the first sub-pixels of the odd numbered row of pixels to display the first left eye image and drives the first sub-pixels of the even numbered row of pixels to display the first right eye image through the sources of the first switches of the first sub-pixels of the odd numbered row of pixels and the sources of the first switches of the first sub-pixels of the even numbered row of pixels connected with the data lines, wherein the first left eye image is the odd numbered row image of the left eye image and the first right eye image is the odd numbered row image of the right eye image. Specifically, the 3D display device drives the first sub-pixels of the odd numbered row of pixels to display the first left eye image and drives the first sub-pixels of the even numbered row of pixels to display the first right eye image through the data lines.

At the same time, after the first sub-pixels of the odd numbered row of pixels and the second sub-pixels of the even numbered row of pixels are turned on, the 3D display device drives the second sub-pixels of the odd numbered row of pixels to display a black image and the second sub-pixels of the even numbered row of pixels to display a black image through the sources of the second switches of the second sub-pixels of the odd numbered row of pixels connected with the first common electrode line and the sources of the second switches of the second sub-pixels of the even numbered row of pixels connected with the third common electrode line.

Specifically, the driving method may include the following:

The 3D display device transmits the first left eye image to the first sub-pixels of the odd numbered row of pixels through the sources of the first switches of the first sub-pixels of the odd numbered row of pixels connected with the data lines, to drive the first sub-pixels of the odd numbered row of pixels to display the first left eye image;

The 3D display device transmits the first right eye image to the first sub-pixels of the even numbered row of pixels through the sources of the first switches of the first sub-pixels of the even numbered row of pixels connected with the data lines, to drive the first sub-pixels of the even numbered row of pixels to display the first right eye image;

The 3D display device transmits the black image to the second sub-pixels of the odd numbered row of pixels through the sources of the second switches of the second sub-pixels of the odd numbered row of pixels connected with the first common electrode line, to drive the second sub-pixels of the odd numbered row of pixels to display the black image;

The 3D display device transmits the black image to the second sub-pixels of the even numbered row of pixels through the sources of the second switches of the second sub-pixels of the even numbered row of pixels connected with the third common electrode line, to drive the second sub-pixel of the even numbered row of pixels to display the black image.

S104. The 3D display device inputs a high level signal to the second gate line to turn on first switches of second sub-pixels of the odd numbered row of pixels, inputs a high level signal to the fourth gate line to turn on first switches of second sub-pixels of the even numbered row of pixels, inputs a high level signal to the first common electrode line to turn on second switches of first sub-pixels of the odd numbered row of pixels, and inputs a high level signal to the third common electrode line to turn on second switches of first sub-pixels of the even numbered row of pixels.

The 3D display device inputs a high level signal Vgh to the second gate line. A first switch is disposed between the second gate line and each second sub-pixel of the odd numbered row of pixels, which may be a TFT, a MOS transistor or the like. The second gate line transmits the high level signal Vgh to a gate of the first switch to turn on the first switch of each second sub-pixel of the odd numbered row of pixels, which in turn turns on the second sub-pixel of the odd numbered row of pixels. The 3D display device inputs a high level signal Vgh to the fourth gate line. A first switch is disposed between the fourth gate line and each second sub-pixel of the even numbered row of pixels. The fourth gate line transmits the high level signal Vgh to the gate of the first switch to turn on the first switch of each second sub-pixel of the even numbered row of pixels, which in turn turns on the second sub-pixel of the even numbered row pixels.

At the same time, the 3D display device inputs a high level signal Vch to the first common electrode line. A second switch is disposed between the first common electrode line and each first sub-pixel of the odd numbered row of pixels, which may be a TFT, a MOS transistor or the like. The first common electrode line transmits the high level signal Vch to a gate of the second switch to turn on the second switch of each first sub-pixel of the odd numbered row of pixels, which in turn turns on the first sub-pixel of the odd numbered row of pixels. The 3D display device inputs a high level signal Vch to the third common electrode line. A second switch is disposed between the third common electrode line and each first sub-pixel of the even numbered row of pixels. The third common electrode line transmits the high level signal Vch to the gate of the second switch to turn on the second switch of each first sub-pixel of the even numbered row of pixels, which in turn turns on the first sub-pixel of the even numbered row pixels.

S105. The 3D display device drives the second sub-pixels of the odd numbered row of pixels to display a second left eye image, drives the second sub-pixel of the even numbered row of pixels to display a second right eye image, wherein the second left eye image is the even numbered row image of the left eye image and the second right eye image is the even numbered row image of the right eye image, and drives the first sub-pixels of the odd numbered row of pixels to display a black image, and drives the first sub-pixels of the even numbered row of pixels to display a black image.

Similarly, the driving method may specifically include the following.

The 3D display device transmits the second left eye image to the second sub-pixels of the odd numbered row of pixels through the sources of the first switches of the second sub-pixels of the odd numbered row of pixels connected with the data lines, to drive the second sub-pixels of the odd numbered row of pixels to display the second left eye image;

The 3D display device transmits the second right eye image to the second sub-pixels of the even numbered row of pixels through the sources of the first switches of the second sub-pixels of the even numbered row of pixels connected with the data lines, to drive the second sub-pixels of the even numbered row of pixels to display the second right eye image;

The 3D display device transmits the black image to the first sub-pixels of the odd numbered row of pixels through the sources of the second switches of the first sub-pixels of the odd numbered row of pixels connected with the second common electrode line, to drive the first sub-pixels of the odd numbered row of pixels to display the black image;

The 3D display device transmits the black image to the first sub-pixels of the even numbered row of pixels through the sources of the second switches of the first sub-pixels of the even numbered row of pixels connected with the fourth common electrode line, to drive the first sub-pixels of the even numbered row of pixels to display the black image.

Figure 3:
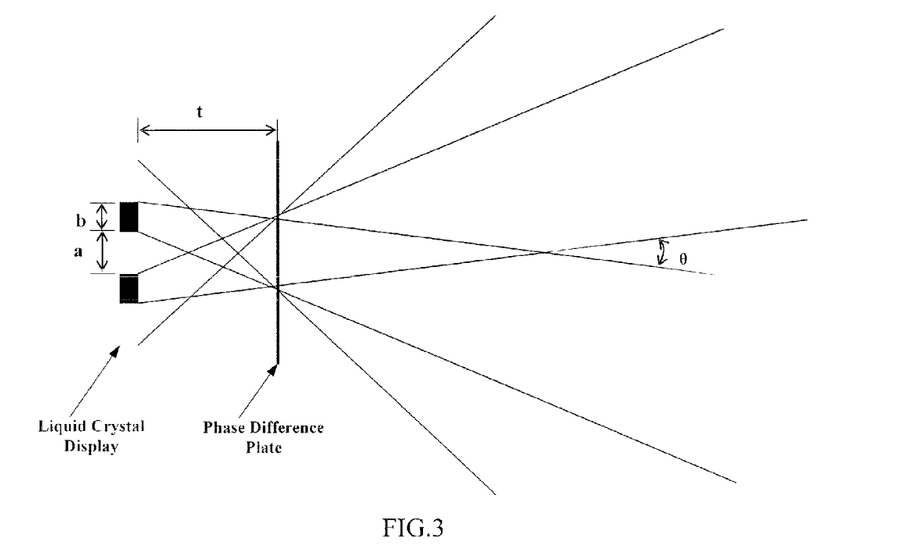
FIG. 3 is a display method of a 3D display device according to an embodiment of the present invention.

It should be noted that, since in the embodiment of the present invention, the first sub-pixels and the second sub-pixels of the odd numbered rows of pixels are used to display the black image alternately, and the first sub-pixels and the second sub-pixels of the even numbered rows of pixels display the black image alternately, the view angle in the vertical direction of the 3D display panel is greatly improved, as illustrated in FIG. 3. The formulae for the vertical view angle of 3D display may be:

$$\theta = 2 \times \arcsin\left(n \times \sin\left(\arctan\left(\frac{b}{2t}\right)\right)\right)$$

wherein,

θ is the angle at which the 3D picture may be normally viewed;

b is the width of the black image;

t is the distance between the display panel and the phase difference plate, which is generally the thickness of the color filter substrate; and n is the refractive index of the medium between the display panel and the phase difference plate, which is generally the refractive index of the color filter substrate.

As can be seen from the formulae, the view angle is positively correlated with the width of the black image, a larger 3D view angle than traditional technology can be obtained when the pixel structure and circuit driving method in the embodiment of the present invention are adopted.

S106. The 3D display device executes steps S102, S103, S104 and S105 in a loop until the image display is completed.

According to the description of steps S102 to S105, the 3D display device executes steps S102 to S105 in a loop until the image display is completed.

Furthermore, since the black image is written into the sub-pixels, the power consumption of the display panel can be reduced. The power consumption of the display panel can be obtained with the following formulae:

$$p = \tfrac{1}{2} fcv^2$$

wherein, f is the frequency of voltage charging and discharging, v is the voltage range of charging and discharging, and c is the equivalent capacitance.

With embodiment of the present invention, the total power consumption of the display panel becomes as:

$$p = po + pe = \tfrac{1}{2} fc_o v_o^2 + \tfrac{1}{2} fc_e v_e^2$$

wherein, po is the power consumption of the first sub-pixels of the odd numbered row of pixels and the first sub-pixels of the even numbered row of pixels, pe is the power consumption of the second sub-pixels of the odd numbered row of pixels and the second sub-pixels of the even numbered row of pixels, $c_o$ is the equivalent capacitance of the first sub-pixels of the odd numbered row of pixels and the first sub-pixels of the even numbered row of pixels, $v_o$ is the voltage range of charging and discharging of the first sub-pixels of the odd numbered row of pixels and the first sub-pixels of the even numbered row of pixels, $c_e$ is the equivalent capacitance of the second sub-pixels of the odd numbered row of pixels and the second sub-pixels of the even numbered row of pixels, and $v_e$ is the voltage range of charging and discharging of the second sub-pixels of the odd numbered row of pixels and the second sub-pixels of the even numbered row of pixels.

Compared with the traditional technology, with the embodiment of the present invention, f is kept constant, and c becomes a half of the original value (since the original pixel area is divided into two equal parts, namely $c_o = c_e = C/2$). v consists of two parts, one is the normally displayed part with a value equal to original value (that is $v_o$ or $v_e = v$); and the other part is a part of the black image, and since this part has no reversal of signal polarity, the value is about v/2. According to derivative of the formula, the power consumption would become 75% of the original value.

Furthermore, inputting of the black image in a blanking time period may ensure the original signal frequency will not increase.

Compared with the traditional technology, since one pixel is divided into two sub-pixels, the physical resolution in the vertical direction in the embodiment of the present invention becomes two times of the original resolution. Thus, if a line-by-line scanning is applied, the maximum available charging time for each sub-pixel is 1/frame frequency/(2V'), wherein V' is generally greater than V, which contains the blanking time period of each frame, V denotes the vertical resolution which is the effective scanning pulse number for one frame of picture, V' is the sum of V and the number of scanning pulses in the blanking time period of one frame picture. When the circuit driving mode of the present invention is used, since half of the pixels are inputted with a black image in a blanking time period without occupying normal charging time, the maximum available charging time for each sub-pixel is 1/frame frequency/(V'). Therefore, charging time of each sub-pixel is the same as the traditional technology, and the pixel has an area reduced by half, which is more advantageous for pixel charging rate.

The embodiment of the present invention provides a 3D display method. Each pixel in the display panel includes a first sub-pixel and a second sub-pixel. A first left eye image is displayed by driving the first sub-pixels of the odd numbered rows of pixels, and a first right eye image is displayed by driving the first sub-pixels of the even numbered rows of pixels, wherein the first left eye image is the odd numbered row image of the left eye image, the first right eye image is the odd numbered row image of the right eye image. The second sub-pixels of the odd numbered rows of pixels are driven to display the black image and the second sub-pixels of the even numbered rows of pixels are driven to display the black image, and then the second sub-pixels of the odd numbered rows of pixels are driven to display the second left eye image, and the second sub-pixels of the even numbered rows of pixels are driven to display the second right eye image, wherein the second left eye image is the even numbered row image of the left eye image and the second right eye image is the even numbered row image of the right eye image. The first sub-pixels of the odd numbered rows of pixels are driven to display a black image, and the first sub-pixels of the even numbered rows of pixels are driven to display a black image. Furthermore, since each pixel in the display panel includes a first sub-pixel and a second sub-pixel, and when one sub-pixel is driven to display an image, the other sub-pixel is driven to display a black image, the view angle of the 3D display panel can be increased, image retention can be avoided, and it is possible to reduce power consumption of the display device.

Embodiment II

Figure 4:
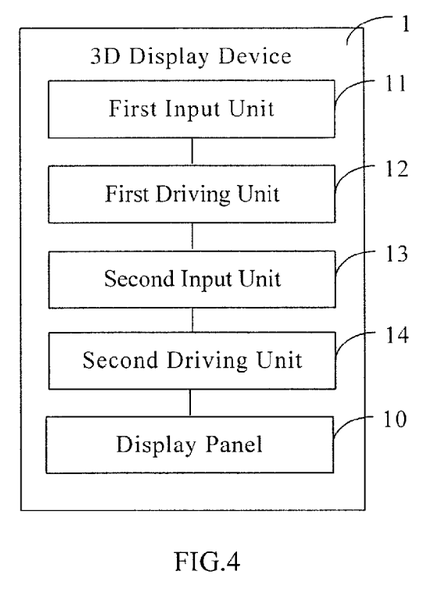
FIG. 4 is a structural representation I of a 3D display device provided in embodiment II of the present invention.

An embodiment of the present invention provide a 3D display device 1, as illustrated in FIG. 4, including:

a display panel 10 including a plurality rows and columns of pixels arranged in array, the plurality rows of pixels including odd numbered rows of pixels and even numbered rows of pixels, and each pixel including a first sub-pixel and a second sub-pixel; each pixel in the display panel further including a first switch and a second switch; the display panel further including: first gate lines connected with gates of the first switches of the first sub-pixels of the odd numbered rows of pixels; second gate lines connected with gates of the first switches of the second sub-pixels of the odd numbered rows of pixels; third gate lines connected with gates of the first switches of the first sub-pixels of the even numbered rows of pixels; fourth gate lines connected with gates of the first switches of the second sub-pixels of the even numbered rows of pixels; first common electrode lines connected with gates of the second switches of the second sub-pixels of the odd numbered rows of pixels and connected with sources of the second switches of the first sub-pixels of the odd numbered rows of pixels; second common electrode lines connected with gates of the second switches of the second sub-pixels of the odd numbered rows of pixels and connected with sources of the second switches of the first sub-pixels of the odd numbered rows of pixels; third common electrode lines connected with gates of the second switches of the first sub-pixels of the even numbered rows of pixels and connected with sources of the second switches of the second sub-pixels of the even numbered rows of pixels; fourth common electrode lines connected with sources of the second switches of the first sub-pixels of the even numbered rows of pixels and connected with gates of the second switches of the second sub-pixels of the even numbered rows of pixels; data lines connected with sources of the first switches of all the sub-pixels respectively.

Corresponding to the embodiment I, it can be understood with reference to FIG. 2 that, the display panel 10 of the 3D display device 1 according to the embodiment of the present invention includes a plurality rows and columns of pixels arranged in array, each pixel including a first sub-pixel and a second sub-pixel, the rows of the first sub-pixels and the rows of the second sub-pixels are arranged alternately, the plurality rows of pixels include odd numbered rows of pixels 101 and even numbered rows of pixels 102, wherein the odd numbered rows of pixels 101 include the first sub-pixels 1011 and the second sub-pixels 1012 of the odd numbered rows of pixels 101, and the even numbered rows of pixels 102 include the first sub-pixels 1021 and the second sub-pixels 1022 of the even numbered rows of pixels 102.

Each pixel in the display panel 10 further includes a first switch 107 and a second switch 108.

The display panel 10 further includes:

first gate lines 103 connected with gates of the first switches 107 of the first sub-pixels 1011 of the odd numbered rows of pixels 101;

second gate lines 104 connected with gates of the second switches 107 of the second sub-pixels 1012 of the odd numbered rows of pixels 101;

third gate lines 105 connected with gates of the first switches 107 of the first sub-pixels 1021 of the even numbered rows of pixels 102;

fourth gate lines 106 connected with gates of the first switches 107 of the second sub-pixels 1022 of the even numbered rows of pixels 102;

first common electrode lines 109 connected with gates of the second switches 108 of the first sub-pixels 1011 of the odd numbered rows of pixels 101 and connected with sources of the second switches 108 of second sub-pixels 1012 of the odd numbered rows of pixels 101;

second common electrode lines 110 connected with gates of the second switches 108 of the second sub-pixels 1012 of the odd numbered rows of pixels 101 and connected with sources of the second switches 108 of first sub-pixels 1011 of the odd numbered rows of pixels 101;

third common electrode lines 111 connected with gates of the second switches 108 of first sub-pixels 1021 of the even numbered rows of pixels 102 and connected with sources of the second switches 108 of second sub-pixels 1022 of the even numbered row of pixels 102;

fourth common electrode lines 112 connected with sources of the second switches 108 of the first sub-pixels 1021 of the even numbered rows of pixels 102 and connected with gates of the second switches 108 of second sub-pixels 1022 of the even numbered rows of pixels 102;

data lines 113 connected with sources of first switches 107 of all the sub-pixel respectively.

The first sub-pixels 1011 and the second sub-pixels 1012 of the odd numbered rows of pixels 101 may have compatible aperture ratio and transmittance, identical pixel structure, and may also be of up-and-down symmetrical structure or in other arrangement. The first sub-pixels 1021 and the second sub-pixels 1022 of the even numbered rows of pixels 102 may have compatible aperture ratio and transmittance, identical pixel structure, and may also be of up-and-down symmetrical structure or in other arrangement. The present invention is not limited thereto.

A first input unit 11 for inputting a high level signal to the first gate lines to turn on first switches of the first sub-pixels of the odd numbered rows of pixels, inputting a high level signal to the second gate lines to turn on the first switches of first sub-pixels of the even numbered rows of pixels, inputting a high level signal to the second common electrode lines to turn on second switches of second sub-pixels of the odd numbered rows of pixels, and inputting a high level signal to the fourth common electrode lines to turn on second switches of second sub-pixels of the even numbered rows of pixels;

A first driving unit 12 for transmitting the first left eye image to the first sub-pixels of the odd numbered rows of pixels through the sources of the first switches of the first sub-pixels of the odd numbered rows of pixels connected with the data lines, to drive the first sub-pixels of the odd numbered rows of pixels to display the first left eye image, and transmitting the first right eye image to the first sub-pixels of the even numbered rows of pixels through the sources of the first switches of the first sub-pixels of the even numbered rows of pixels connected with the data lines, to drive the first sub-pixels of the even numbered rows of pixels to display the first right eye image, transmitting the black image to the second sub-pixels of the odd numbered rows of pixels through the sources of the second switches of the second sub-pixels of the odd numbered rows of pixels connected with the first common electrode line, to drive the second sub-pixels of the odd numbered rows of pixels to display the black image, and transmitting the black image to the second sub-pixels of the even numbered rows of pixels through the sources of the second switches of the second sub-pixels of the even numbered rows of pixels connected with the third common electrode lines, to drive the second sub-pixels of the even numbered rows of pixels to display the black image, wherein the first left eye image is the odd numbered row image of the left eye image, and the first right eye image is the odd numbered row image of the right eye image;

a second input unit 13 for inputting a high level signal to the second gate lines to turn on the first switches of the second sub-pixels of the odd numbered rows of pixels, inputting a high level signal to the fourth gate lines to turn on the first switches of the second sub-pixels of the even numbered rows of pixels, inputting a high level signal to the first common electrode lines to turn on the second switches of the first sub-pixels of the odd numbered rows of pixels, and inputting a high level signal to the third common electrode lines to turn on the second switches of the first sub-pixels of the even numbered rows of pixels; and a second driving unit 14 for transmitting the second left eye image to the second sub-pixels of the odd numbered rows of pixels through the sources of the first switches of the second sub-pixels of the odd numbered rows of pixels connected with the data lines, to drive the second sub-pixels of the odd numbered rows of pixels to display the second left eye image, transmitting the second right eye image to the second sub-pixels of the even numbered rows of pixels through the sources of the first switches of the second sub-pixels of the even numbered rows of pixels connected with the data lines, to drive the second sub-pixels of the even numbered rows of pixels to display the second right eye image, transmitting the black image to the first sub-pixels of the odd numbered rows of pixels through the sources of the second switches of the first sub-pixels of the odd numbered rows of pixels connected with the second common electrode lines, to drive the first sub-pixels of the odd numbered rows of pixels to display the black image, and transmitting the black image to the first sub-pixels of the even numbered rows of pixels through the sources of the second switches of the first sub-pixels of the even numbered rows of pixels connected with the fourth common electrode lines, to drive the first sub-pixels of the even numbered rows of pixels to display the black image, wherein the second left eye image is the even numbered row image of the left eye image, and the second right eye image is the even numbered row image of the right eye image.

Furthermore, the first input unit 11 is connected with the first gate lines, the third gate lines, the second common electrode lines and the fourth common electrode lines;

The first driving unit 12 is connected with the data lines, the first common electrode lines and the third common electrode lines;

The second input unit 13 is connected with the second gate lines, the fourth gate lines, the first common electrode lines and the third common electrode lines; and The second driving unit 14 is connected with the data lines, the second common electrode lines and the fourth common electrode lines.

Furthermore, each pixel in the display panel includes a first sub-pixel and a second sub-pixel, the rows of the first sub-pixels and the rows of the second sub-pixels are arranged alternately, or the first sub-pixels and the second sub-pixels are arranged alternately in the column direction.

Preferably, as illustrated in FIG. 2, a first common electrode line and a second common electrode line divide each pixel of the odd numbered rows of pixels into a first sub-pixel and a second sub-pixel; a third common electrode line and a fourth common electrode line divide each pixel of the even numbered rows of pixels into a first sub-pixel and a second sub-pixel. With the above-mentioned connecting method, it is more convenient to connect lines. Of course, one of ordinary skill in the art may also modify positions of the first common electrode lines, the second common electrode lines, the third common electrode lines and the fourth common electrode lines according to practical requirements, as long as correct connecting relationship between them and pixels is satisfied.

Figure 5:
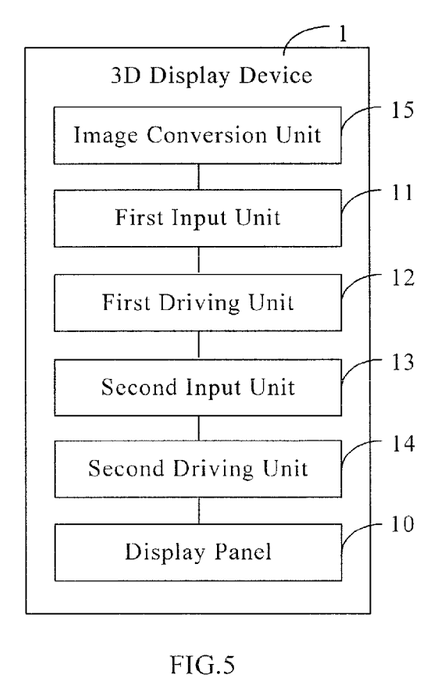
FIG. 5 is a structural representation II of a 3D display device provided in embodiment II of the present invention.
Figure 6:
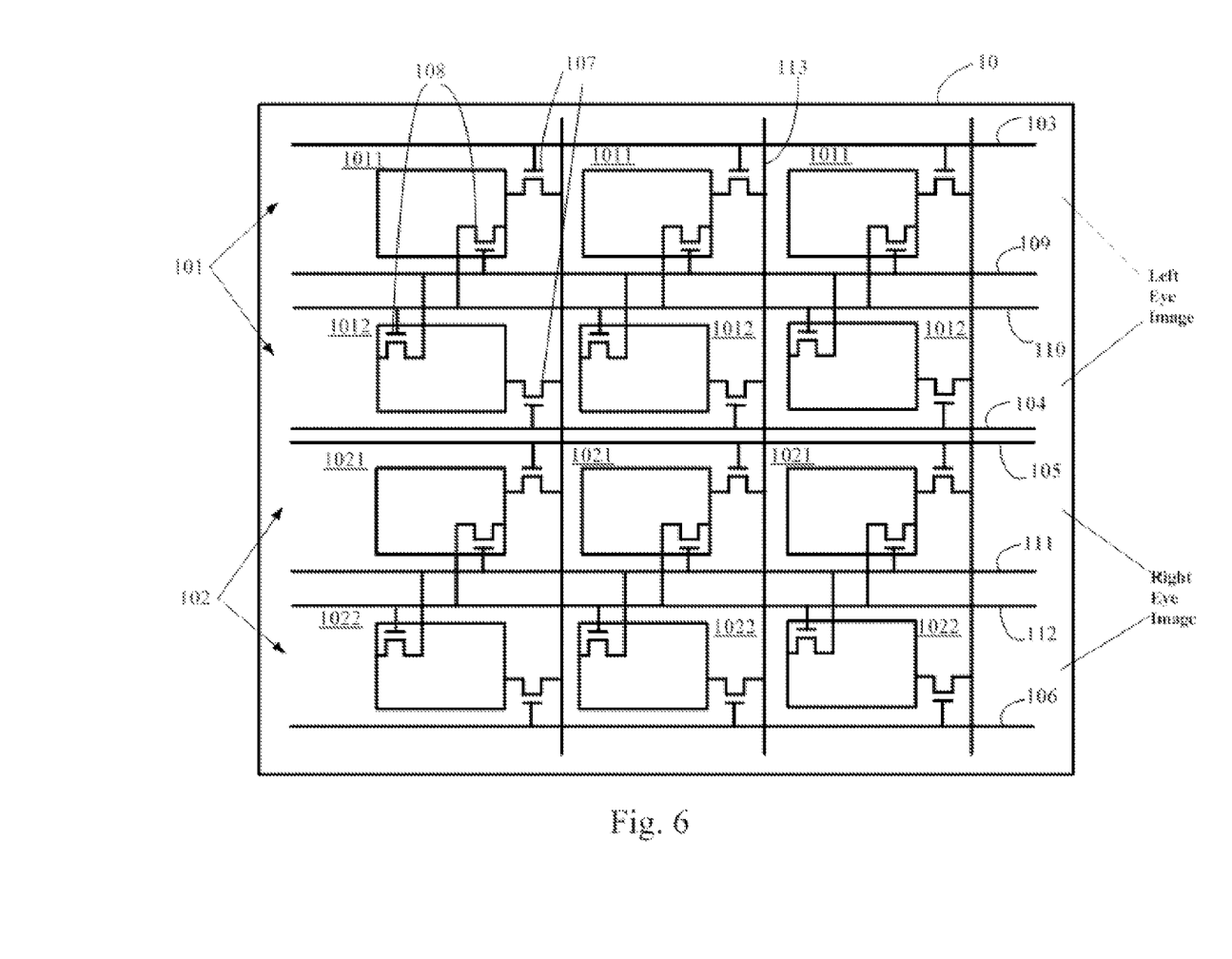
FIG. 6 is a structural representation of a display panel provided in an embodiment of the present invention.

Furthermore, as illustrated in FIG. 5, the 3D display device 1 may further includes:

an image conversion unit 15 for converting a 2D image into a left eye image and a right eye image for 3D display, the displacement between the left eye image and the right eye image being different.

Embodiments of the present invention provide a 3D display device and a display method. Each pixel in the display panel includes a first sub-pixel and a second sub-pixel. A first left eye image is displayed by driving the first sub-pixels of the odd numbered rows of pixels, and a first right eye image is displayed by driving the first sub-pixels of the even numbered rows of pixels, wherein the first left eye image is the odd numbered row image of the left eye image and the first right eye image is the odd numbered row image of the right eye image; the second sub-pixels of odd numbered rows of pixels are driven to display a black image, and the second sub-pixels of even numbered rows of pixels are driven to display the black image. Then, the second sub-pixels of odd numbered rows of pixels are driven to display the second left eye image, and the second sub-pixels of even numbered rows of pixels are driven to display the second right eye image, wherein the second left eye image is the even numbered row image of the left eye image and the second right eye image is the even numbered row image of the right eye image; the first sub-pixels of the odd numbered rows of pixels are driven to display a black image, and the first sub-pixels of the even numbered rows to display a black image.

The 3D display device and the display method according to an embodiment of the present invention have at least the following advantages:

(1) The view angle of the 3D display panel can be increased;

(2) The image retention can be avoided;

(3) The power consumption of the display device can be reduced; and (4) The charging rate can be advantageously realized.

The above is only exemplary implementations of the present invention, rather than for limiting protection scope of the present invention, which is defined by the appended claims.

The invention claimed is:

1. A three-dimensional (3D) display method for displaying 3D images on a display panel, each pixel in the display panel comprising a first sub-pixel and a second sub-pixel, the 3D images including at least a left image and a right image, the method comprising:

step a: driving first sub-pixels of odd numbered rows of pixels to display a first left eye image, and driving first sub-pixels of even numbered rows of pixels to display a first right eye image, wherein the first left eye image is an odd numbered row image of the left image and the first right eye image is an odd numbered row image of the right image, and driving second sub-pixels of the odd numbered rows of pixels to display a black image, and driving second sub-pixels of the even numbered rows to display a black image;

step b: driving second sub-pixels of the odd numbered rows of pixels to display a second left eye image, and driving second sub-pixels of even numbered rows of pixels to display a second right eye image, wherein the second left eye image is an even numbered row image of the left image and the second right eye image is an even numbered row image of the right image, and driving first sub-pixels of the odd numbered rows of pixels to display a black image, and driving first sub-pixels of the even numbered rows to display a black image; and performing steps a and b in a loop until the 3D images are displayed completely, wherein:

each pixel in the display panel comprises a first switch and a second switch;

the display panel further comprises:

first gate lines connected with gates of first switches of the first sub-pixels of the odd numbered rows of pixels;

second gate lines connected with gates of first switches of the second sub-pixels of the odd numbered rows of pixels;

third gate lines connected with gates of first switches of the first sub-pixels of the even numbered rows of pixels;

fourth gate lines connected with gates of first switches of the second sub-pixels of the even numbered rows of pixels;

first common electrode lines connected with gates of second switches of first sub-pixels of the odd numbered rows of pixels and connected with sources of second switches of second sub-pixels of the odd numbered rows of pixels;

second common electrode lines connected with gates of second switches of second sub-pixels of the odd numbered rows of pixels and connected with sources of second switches of first sub-pixels of the odd numbered rows of pixels;

third common electrode lines connected with gates of second switches of first sub-pixels of the even numbered rows of pixels and connected with sources of second switches of second sub-pixels of the even numbered rows of pixels;

fourth common electrode lines connected with sources of second switches of first sub-pixels of the even numbered rows of pixels and connected with gates of second switches of second sub-pixels of the even numbered rows of pixels; and data lines connected with sources of the first switches of all the sub-pixels; and step a of driving first sub-pixels of the odd numbered rows of pixels to display the first left eye image, driving first sub-pixels of the even numbered rows of pixels to display the first right eye image, driving second sub-pixels of the odd numbered rows of pixels to display the black image and driving the second sub-pixels of the even numbered rows to display the black image comprises:

inputting an on signal to the first gate lines to turn on the first switches of the first sub-pixels of the odd numbered rows of pixels, and transmitting the first left eye image to the first sub-pixels of the odd numbered rows of pixels through the sources of the first switches of the first sub-pixels of the odd numbered rows of pixels connected with the data lines, to drive the first sub-pixels of the odd numbered rows of pixels to display the first left eye image;

inputting an on signal to the third gate lines to turn on the first switches of the first sub-pixels of the even numbered rows of pixels, and transmitting the first right eye image to the first sub-pixels of the even numbered rows of pixels through the sources of the first switches of the first sub-pixels of the even numbered rows of pixels connected with the data lines, to drive the first sub-pixels of the even numbered rows of pixels to display the first right eye image;

inputting an on signal to the second common electrode lines to turn on the second switches of the second sub-pixels of the odd numbered rows of pixels, and transmitting the black image to the second sub-pixels of the odd numbered rows of pixels through the sources of the second switches of the second sub-pixels of the odd numbered rows of pixels connected with the first common electrode lines, to drive the second sub-pixels of the odd numbered rows of pixels to display the black image; and inputting an on signal to the fourth common electrode lines to turn on the second switches of the second sub-pixels of the even numbered rows of pixels, and transmitting the black image to the second sub-pixels of the even numbered rows of pixels through the sources of the second switches of the second sub-pixels of the even numbered rows of pixels connected with the third common electrode lines, to drive the second sub-pixels of the even numbered rows of pixels to display the black image.

2. The 3D display method of claim 1, wherein the step b of the driving second sub-pixels of the odd numbered rows of pixels to display the second left eye image, driving second sub-pixels of the even numbered rows of pixels to display the second right eye image, driving first sub-pixels of the odd numbered rows of pixels to display the black image and driving the first sub-pixels of the even numbered rows to display the black image comprises:

inputting an on signal to the second gate lines to turn on the first switches of the second sub-pixels of the odd numbered rows of pixels, to transmit the second left eye image to the second sub-pixels of the odd numbered rows of pixels through the sources of the first switches of the second sub-pixels of the odd numbered row of pixels connected with the data lines, to drive the second sub-pixels of the odd numbered rows of pixels to display the second left eye image;

inputting an on signal to the fourth gate lines to turn on the first switches of the second sub-pixels of the even numbered rows of pixels, to transmit the second right eye image to the second sub-pixels of the even numbered rows of pixels through the sources of the first switches of the second sub-pixels of the even numbered rows of pixels connected with the data lines, to drive the second sub-pixels of the even numbered rows of pixels to display the second right eye image;

inputting an on signal to the first common electrode lines to turn on the second switches of the first sub-pixels of the odd numbered rows of pixels, to transmit the black image to the first sub-pixels of the odd numbered rows of pixels through the sources of the second switches of the first sub-pixels of the odd numbered rows of pixels connected with the second common electrode lines, to drive the first sub-pixels of the odd numbered rows of pixels to display the black image;

inputting an on signal to the third common electrode lines to turn on the second switches of the first sub-pixels of the even numbered rows of pixels, to transmit the black image to the first sub-pixels of the even numbered rows of pixels through the sources of the second switches of the first sub-pixels of the even numbered rows of pixels connected with the fourth common electrode lines, to drive the first sub-pixels of the even numbered rows of pixels to display the black image.

3. The 3D display method of claim 1, wherein the first sub-pixels and the second sub-pixels are arranged alternately in a column direction.

4. The 3D display method of claim 1, further comprising, prior to the step a:

converting a 2D image into the left image and the right image for 3D display.

5. The 3D display method of claim 1, wherein the black image is written in a blanking time period.

6. A three-dimensional (3D) display device, comprising:
a display panel including a plurality rows and columns of pixels arranged in an array, the plurality rows of pixels including odd numbered rows of pixels and even numbered rows of pixels, and each pixel including a first sub-pixel and a second sub-pixel; and
each pixel in the display panel further comprising a first switch and a second switch;
wherein the display panel further comprises:
first gate lines connected with gates of first switches of the first sub-pixels of the odd numbered rows of pixels;
second gate lines connected with gates of first switches of the second sub-pixels of the odd numbered rows of pixels;
third gate lines connected with gates of first switches of the first sub-pixels of the even numbered rows of pixels;
fourth gate lines connected with gates of first switches of the second sub-pixels of the even numbered rows of pixels;
first common electrode lines connected with gates of second switches of first sub-pixels of the odd numbered rows of pixels and connected with sources of second switches of second sub-pixels of the odd numbered rows of pixels;
second common electrode lines connected with gates of second switches of second sub-pixels of the odd numbered rows of pixels and connected with sources of second switches of first sub-pixels of the odd numbered rows of pixels, wherein the gates and the sources of the second switches of the first sub-pixels of the odd numbered rows of pixels are directly connected with the first common electrode lines and the second common electrode lines, respectively;
third common electrode lines connected with gates of second switches of first sub-pixels of the even numbered rows of pixels and connected with sources of second switches of second sub-pixels of the even numbered rows of pixels; and
fourth common electrode lines connected with sources of second switches of first sub-pixels of the even numbered rows of pixels and connected with gates of second switches of second sub-pixels of the even numbered rows of pixels; and
data lines connected with sources of the first switches of all the sub-pixels; and
wherein the 3D display device further comprises:
a first input circuit for inputting an on signal to the first gate lines to turn on the first switches of the first sub-pixels of the odd numbered rows of pixels, inputting an on signal to the third gate lines to turn on the first switches of the first sub-pixels of the even numbered rows of pixels, inputting an on signal to the second common electrode lines to turn on the second switches of the second sub-pixel of the odd numbered rows of pixels, and inputting an on signal to the fourth common electrode lines to turn on the second switches of the second sub-pixels of the even numbered rows of pixels; and
a first driving circuit for transmitting a first left eye image to the first sub-pixels of the odd numbered rows of pixels through the sources of the first switches of the first sub-pixels of the odd numbered rows of pixels connected with the data lines, to drive the first sub-pixels of the odd numbered rows of pixels to display the first left eye image, transmitting a first right eye image to the first sub-pixels of the even numbered rows of pixels through the sources of the first switches of the first sub-pixels of the even numbered rows of pixels connected with the data lines, to drive the first sub-pixels of the even numbered rows of pixels to display the first right eye image, transmitting the black image to the second sub-pixels of the odd numbered rows of pixels through the sources of the second switches of the second sub-pixels of the odd numbered rows of pixels connected with the first common electrode lines, to drive the second sub-pixels of the odd numbered rows of pixels to display the black image, and transmitting the black image to the second sub-pixels of the even numbered rows of pixels through the sources of the second switches of the second sub-pixels of the even numbered rows of pixels connected with the third common electrode lines, to drive the second sub-pixels of the even numbered rows of pixels to display the black image, wherein the first left eye image is an odd numbered row image of a left image and the first right eye image is an odd numbered row image of a right image.

7. The 3D display device of claim 6, further comprising:
a second input circuit for inputting an on signal to the second gate lines to turn on the first switches of the second sub-pixels of the odd numbered rows of pixels, inputting an on signal to the fourth gate lines to turn on the first switches of the second sub-pixels of the even numbered rows of pixels, inputting an on signal to the first common electrode lines to turn on the second switches of the first sub-pixels of the odd numbered rows of pixels, and inputting an on signal to the third common electrode lines to turn on the second switches of the first sub-pixels of the even numbered rows of pixels; and
a second driving circuit for transmitting a second left eye image to the second sub-pixels of the odd numbered rows of pixels through the sources of the first switches of the second sub-pixels of the odd numbered rows of pixels connected with the data lines, to drive the second sub-pixels of the odd numbered rows of pixels to display the second left eye image, transmitting a second right eye image to the second sub-pixels of the even numbered rows of pixels through the sources of the first switches of the second sub-pixels of the even numbered rows of pixels connected with the data lines, to drive the second sub-pixels of the even numbered rows of pixels to display the second right eye image, transmitting the black image to the first sub-pixels of the odd numbered rows of pixels through the sources of the second switches of the first sub-pixels of the odd numbered rows of pixels connected with the second common electrode lines, to drive the first sub-pixels of the odd numbered rows of pixels to display the black image, and transmitting the black image to the first sub-pixels of the even numbered rows of pixels through the sources of the second switches of the first sub-pixels of the even numbered rows of pixels connected with the fourth common electrode lines, to drive the first sub-pixels of the even numbered rows of pixels to display the black image, wherein the second left eye image is an even numbered row image of a left image and the second right eye image is an even numbered row image of a right image.

8. The 3D display device of claim 7, wherein
the first input circuit is connected with the first gate lines, third gate lines, second common electrode lines and fourth common electrode lines;
the first driving circuit is connected with the data lines, first common electrode lines and third common electrode lines;
the second input circuit is connected with the second gate lines, fourth gate lines, first common electrode lines and third common electrode lines; and
the second driving circuit is connected with the data lines, second common electrode lines and fourth common electrode lines.

9. The 3D display device of claim 6, wherein the first sub-pixels and the second sub-pixels are arranged alternately in a column direction.

10. The 3D display device of claim 6, wherein
the first common electrode lines and the second common electrode lines divide each pixel of the odd numbered rows of pixels into a first sub-pixel and a second sub-pixel; and
the third common electrode lines and the fourth common electrode lines divide each pixel of the even numbered rows of pixels into a first sub-pixel and a second sub-pixel.

11. The 3D display device of claim 6, further comprising:
an image conversion circuit for converting a 2D image into a left eye image and a right eye image for 3D display.

12. A three-dimensional (3D) display device, comprising:
a display panel, each pixel in the display panel including a first sub-pixel and a second sub-pixel;
a first driving circuit for driving first sub-pixels of odd numbered rows of pixels to display a first left eye image, and driving first sub-pixels of an even numbered rows of pixels to display a first right eye image, wherein the first left eye image is an odd numbered row image of a left image and the first right eye image is the odd numbered row image of a right image, and driving the second sub-pixels of the odd numbered rows of pixels to display a black image, and driving the second sub-pixels of the even numbered row of pixels to display a black image; and
a second driving circuit for driving second sub-pixels of odd numbered rows of pixels to display a second left eye image, and driving second sub-pixels of an even numbered rows of pixels to display a second right eye image, wherein the second left eye image is an even numbered row image of the left image and the second right eye image is the even numbered row image of the right image, and driving the first sub-pixels of the even numbered rows of pixels to display a black image, and driving the first sub-pixels of the odd numbered rows of pixels to display a black image,
wherein each pixel in the display panel comprising a first switch and a second switch;
wherein the display panel further comprises:
first gate lines connected with gates of first switches of the first sub-pixels of the odd numbered rows of pixels;
second gate lines connected with gates of first switches of the second sub-pixels of the odd numbered rows of pixels;
third gate lines connected with gates of first switches of the first sub-pixels of the even numbered rows of pixels;

fourth gate lines connected with gates of first switches of the second sub-pixels of the even numbered rows of pixels;

first common electrode lines connected with gates of second switches of first sub-pixels of the odd numbered rows of pixels and connected with sources of second switches of second sub-pixels of the odd numbered rows of pixels;

second common electrode lines connected with gates of second switches of second sub-pixels of the odd numbered rows of pixels and connected with sources of second switches of first sub-pixels of the odd numbered rows of pixels;

third common electrode lines connected with gates of second switches of first sub-pixels of the even numbered rows of pixels and connected with sources of second switches of second sub-pixels of the even numbered rows of pixels;

fourth common electrode lines connected with sources of second switches of first sub-pixels of the even numbered rows of pixels and connected with gates of second switches of second sub-pixels of the even numbered rows of pixels; and data lines connected with sources of the first switches of all the sub-pixels; and wherein the first driving circuit is further configured to:

input an on signal to the first gate lines to turn on the first switches of the first sub-pixels of the odd numbered rows of pixels, and transmit the first left eye image to the first sub-pixels of the odd numbered rows of pixels through the sources of the first switches of the first sub-pixels of the odd numbered rows of pixels connected with the data lines, to drive the first sub-pixels of the odd numbered rows of pixels to display the first left eye image;

input an on signal to the third gate lines to turn on the first switches of the first sub-pixels of the even numbered rows of pixels, and transmit the first right eye image to the first sub-pixels of the even numbered rows of pixels through the sources of the first switches of the first sub-pixels of the even numbered rows of pixels connected with the data lines, to drive the first sub-pixels of the even numbered rows of pixels to display the first right eye image;

input an on signal to the second common electrode lines to turn on the second switches of the second sub-pixels of the odd numbered rows of pixels, and transmit the black image to the second sub-pixels of the odd numbered rows of pixels through the sources of the second switches of the second sub-pixels of the odd numbered rows of pixels connected with the first common electrode lines, to drive the second sub-pixels of the odd numbered rows of pixels to display the black image; and input an on signal to the fourth common electrode lines to turn on the second switches of the second sub-pixels of the even numbered rows of pixels, and transmit the black image to the second sub-pixels of the even numbered rows of pixels through the sources of the second switches of the second sub-pixels of the even numbered rows of pixels connected with the third common electrode lines, to drive the second sub-pixels of the even numbered rows of pixels to display the black image.

13. The 3D display device of claim 12, wherein the first sub-pixels and the second sub-pixels are arranged alternately in a column direction.

* * * * *